United States Patent [19]
Guillemin

[11] 3,936,749
[45] Feb. 3, 1976

[54] MATCHED FILTER COMMUNICATION SYSTEMS

[75] Inventor: Ernst A. Guillemin, Wellesley, Mass.

[73] Assignee: The United States of America as represented by the Secretary of the Army, Washington, D.C.

[22] Filed: June 23, 1961

[21] Appl. No.: 120,146

[52] U.S. Cl. ................. 325/42; 178/22; 179/1.5 S; 179/15.55 R; 325/32; 325/65
[51] Int. Cl.² ......................................... G01R 33/12
[58] Field of Search ................. 325/40, 42, 65, 32; 179/15.55 R, 1.5; 178/22

[56] References Cited
UNITED STATES PATENTS

| | | | |
|---|---|---|---|
| 1,542,566 | 6/1925 | Mathes | 179/1.5 |
| 2,405,991 | 8/1946 | Beverage et al. | 179/1.5 X |
| 2,632,057 | 3/1953 | Koenig | 179/1.5 |
| 2,982,852 | 5/1961 | Fano | 325/44 |

Primary Examiner—Maynard R. Wilbur
Assistant Examiner—S. C. Buczinski
Attorney, Agent, or Firm—Nathan Edelberg; Robert P. Gibson; Jeremiah G. Murray

[57] ABSTRACT

In a wideband matched filter communication system for transmitting digital information identified by initial sharp pulses from a transmitter thru a communication channel to a receiver, a filter network comprising a multiplicity of filter sections of differing phase-frequency characteristics all in series, the overall characteristic of the entire multiplicity of sections being linear, said sections being distributed between a group at said transmitter and another group at said receiver, the overall characteristics of the sections in each group being non-linear, whereby the various frequency components of the initial sharp pulse are differently delayed in the transmitter group to decrease the amplitude of the pulse signal by spreading its energy over a substantial time period and also differently delayed in the receiver group, but in a complementary manner, to restore the pulse in the receiver at a predetermined time delay due to the operation of the filter.

5 Claims, 8 Drawing Figures

U.S. Patent    February 3, 1976    Sheet 1 of 3    3,936,749
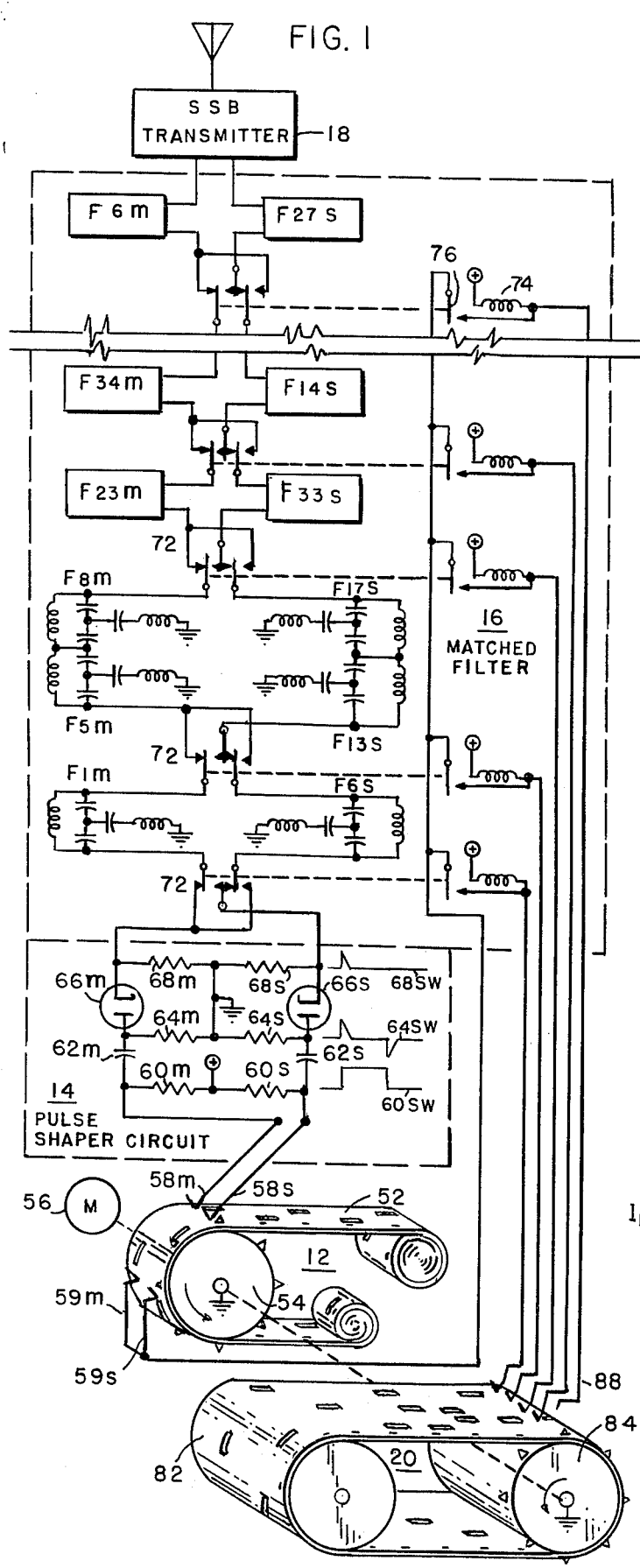
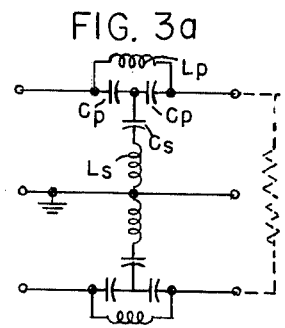
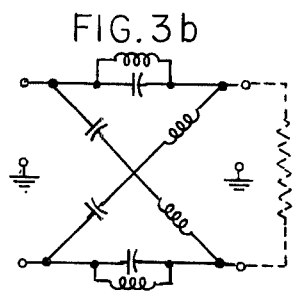
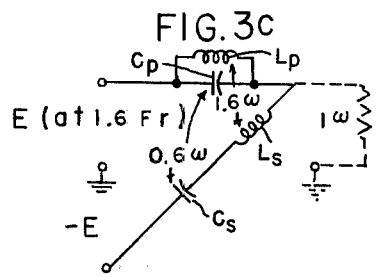
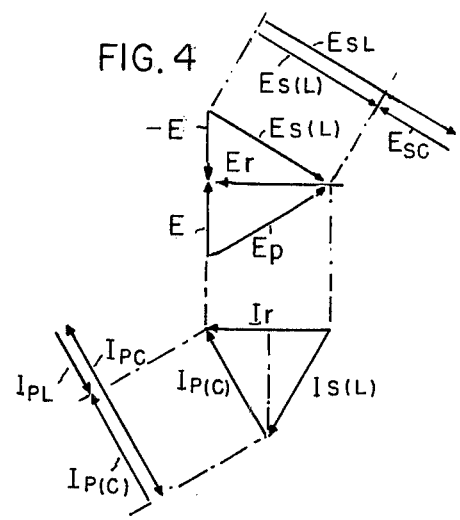
INVENTOR,
ERNST A. GUILLEMIN.
BY Jack H. Linscott
ATTORNEY.

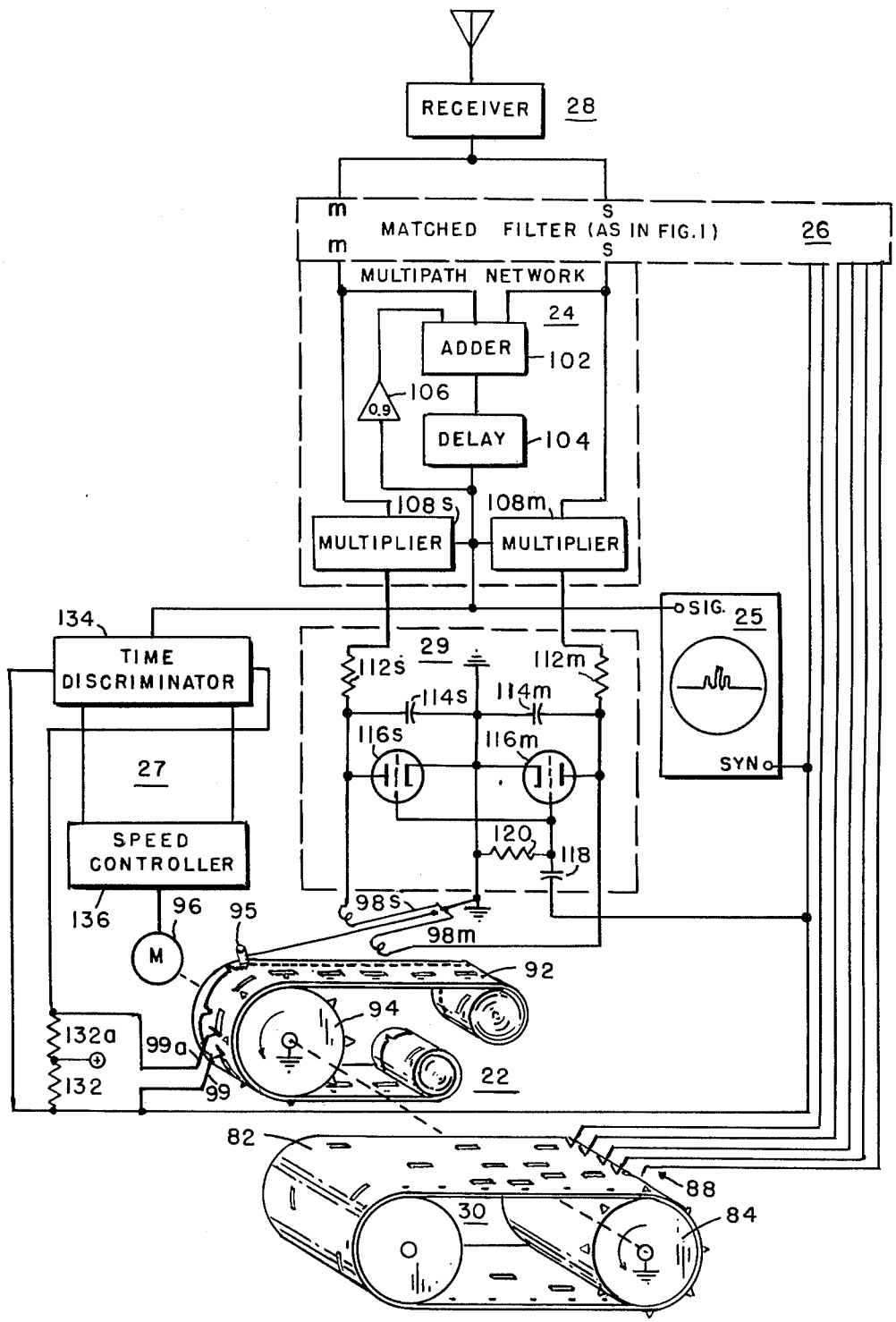

MATCHED FILTER COMMUNICATION SYSTEMS

This invention relates to wide band matched filter communication systems for digital data, in which propagation disturbances and intentional jamming by adversaries have caused difficulty in reception, and security against interception by adversaries and competitors has not been as effective as desired. In the actual system the data is in binary form, such as teletype data involving alternatively mark or space symbols transmitted in succession, any data reducible to digital form could utilize the advantages of the invention. A communication system may be energized by a single sharp pulse to be delivered from the transmitter to the receiver. If such a pulse is applied without substantial change to the transmitter output it will have objectionably high amplitude over a very brief time and therefore require a transmitting circuit of high peak power operating at a very low duty cycle. In view of the considerable bandwidth of such a sharp pulse as shown by Fourier analysis it is possible to separate the pulse into its various frequency components, which may be differently delayed to spread the high peak energy over a considerable time, it a suitable receiving circuit can reform this energy to identify the presence of the original pulse. In such a system the instantaneous amplitude is not excessive and the transmitter duty cycle may be increased substantially to that of a continuous wave system. This also provides for receiver selectivity to energy from the particular source, not possible with the original sharp pulses.

In the present system a suitable filter means is provided in the transmitter to suitably break down the original pulse and spread out its energy in time, and yet a similar but complementary filter means in the receiver can restore the original pulse substantially as transmitted. The combined filter means of transmitter and receiver, as involved in the present invention, is made up of a plurality of somewhat similar sections having different frequency-phase characteristics. The various sections are so related that altho the various frequency components are delayed different amounts in passing thru the various filter sections, in the final output the many frequency components will again coincide in phase to reform the original pulse. If approximately half of these sections are located at the transmitter and the others at the receiver the total delay for the several frequency components to reform the pulse will not be changed, but the delay of the various frequency components at the transmitter may readily be so arranged that the energy peaks from various components are transmitted at different times and therefore eliminate the objectionably high amplitude of the original pulse.

Since communication frequently involves problems of interception and intentional interference or jamming by an adversary the somewhat complex nature of the output of such a filter is of some advantage in requiring detailed analysis of the waveform for interception and to apply jamming energy appropriate to the particular waveform. Since the filter at each station is made up of half the total number of sections it is particularly convenient to provide a full set of sections at each station, with means to provide frequent switching of the sections in a manner to include the desired half of the sections according to a complex permutation code. The same code at the other station would include the complementary half of the sections. Such switching may be as frequent as desired to complicate analysis, before every information pulse if considered necessary. Of course this requires that the switching in the receiver must be synchronized to that in the transmitter. Since the received signal pulses occur in the receiver at a consistent time delay after their initiation in the transmitter, allowing also for propagation time in the communication channel, these pulses can readily provide the necessary synchronization, somewhat analogous to the synchronizing pulses used for television sweep circuits, radar automatic ranging circuits, etc.

In most wide band communication channels there is considerable variation in propagation time of successive signals of similar nature due to the existence of several possible paths, which may slowly vary in effectiveness and even in length; thus successive signals over the various paths, expected to arrive in the same sequence and at the same relative amplitude each time, actually may shift in arrival time or vary enough in magnitude to disappear into and reappear from the ambient noise background. Usually the signals over one or two of the paths pre-dominate in amplitude, but even when there are several effective paths the actual use of the energy in all paths is helpful to improve the signal-to-noise ratio. Since these propagation paths vary rather slowly, yet each individual received pulse might be accompanied by a certain amount of noise, it is possible to store a series of waveforms corresponding to the recently received pulses or groups of pulses revealing the several propagation paths. The amplitude of the waveforms may be permitted to decay slowly so that the most recently received waveforms have the highest amplitude, and the waveforms combined in properly timed relation so that the actual signals of consistent timing will be emphasized and any noise of random timing will be minimized. This may be accomplished on a properly synchronized oscilloscope using persistence of phosphor to provide slow decay (somewhat as the successive signals are displayed in a radar system) to display the multipath pattern prevailing at the time, or in a delay network including a feedback path to keep repeating recently received waveforms at a delay corresponding to the interval between successive pulses and at slightly decreased amplitude with each repetition. The output of such a delay and feedback system may be led to a multiplier network with the incoming mark or space signals to emphasize those portions of the incoming signal which agree with the prevailing multipath pattern (assumed to be true signals) and to exclude those portions of the signal which do not agree with the prevailing multipath pattern (assumed to be made up largely of noise). Then to an integrator to combine individual contributions as a single output proportional to total signal energy.

The object of the invention is to simplify and improve the effectiveness of matched filter communication particularly with regard to the actual matched filter circuits. Other objects will be apparent from the following description.

Much of the subject matter is described in the June, 1960, IRE Transactions on Information Theory, pages 367–373, "A Matched Filter Communication System for Multipath Channels" by Steven M. Sussman, one of the inventors. The system involves a plurality of techniques which are not actually interdependent in the patent sense and yet are so closely related that a description of each is very helpful to an understanding of the other, to show particularly suitable components or supplements for most effective operation. The basic passive matched filter of FIG. 1 (included also as an element of FIG. 2) and other features relating particularly to jamming and interception, not mentioned in the publication, are arranged to simplify both the equipment and operation required for such techniques, and are claimed in this application by the present applicant (acknowledged on page 369 of the publication). The passive matched filter with adder, delay line, feedback circuit, multiplier, etc., to obtain the best output under conditions of multipath propagation, the principal subject of the publication, is claimed in an application of Arthur Kohlenberg, Steven M. Sussman (author of the article), and David Van Meter filed 23 June 1961, Ser. No. 158,148.

The term "matched filter" is of rather broad scope, often designating little more than a simple narrow band filter tuned to the contemplated signal carrier and in some manner further restricted to a particular type of signal on such carrier, for example, pulses occurring within particular time periods. The restriction mentioned often involves some active properties in the filter, as in Wozencraft U.S. Pat. No. 2,880,316 which did not happen to use this terminology, rather than merely passive properties. In the present case the term is applied to a purely passive yet rather sophisticated system as in Part III of the publication cited, altho the multipath technique of Part II and certain other features not purely passive might properly be designated as part of the matched filter in the sense that the receiver is accurately matched to the expected signals as established by the design of the transmitter and actual recent experience with its operation and signal propagation. Thus the signal energy is utilized to the fullest possible extent and at the same time any other energy which would appear as noise is excluded as far as practicable.

The invention is to be described in detail in connection with the accompanying drawings fully illustrating the invention, but showing associated apparatus in as simple form as could be found suitable to meet the requirements of the invention, in which:

FIG. 1 represents a suitable transmitter system and

FIG. 2 a suitable receiver system incorporating the invention;

FIGS. 3–6 are used mainly for purpose of analysis and explanation;

FIG. 3A illustrates the actual bridged T form of filter section, shown doubled to permit a balanced input and output;

FIG. 3B shows an equivalent lattice type of filter section, found to be much more readily analyzed; and FIG. 3C shows only half of such lattice section, found even easier to analyze;

FIG. 4 shows the vector diagram for the particular values of resistance and reactance shown in FIG. 3C;

Figure 5:
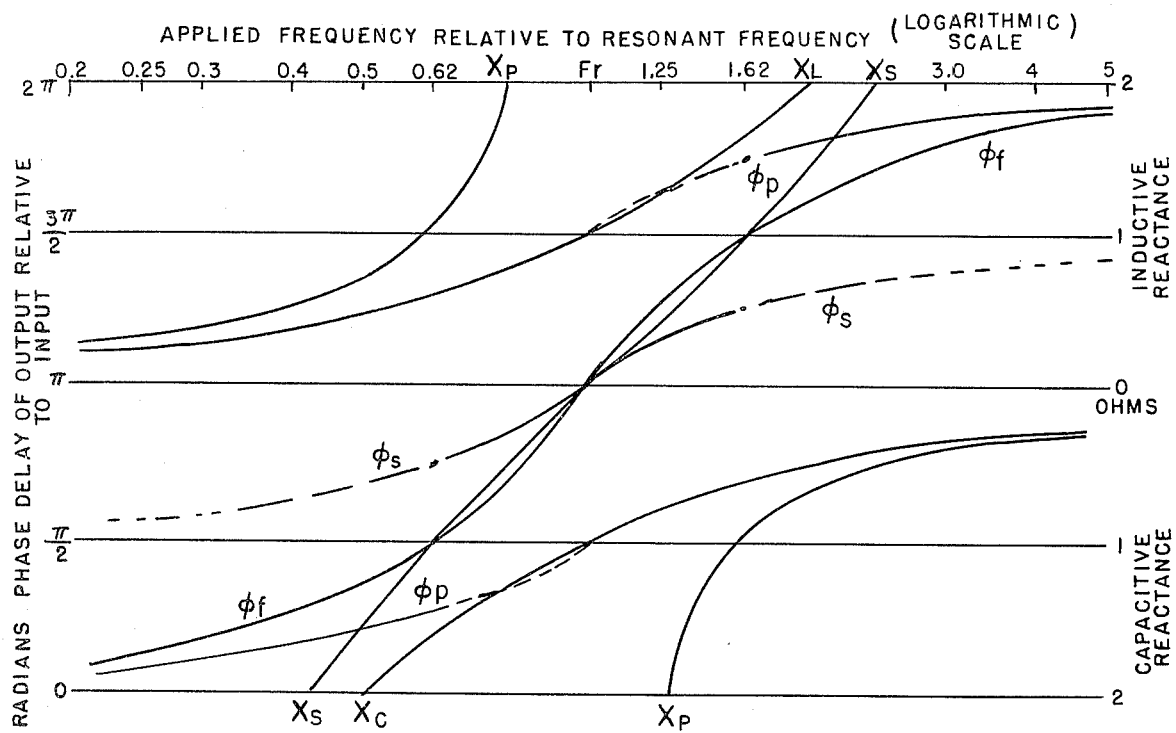
Figure 6:
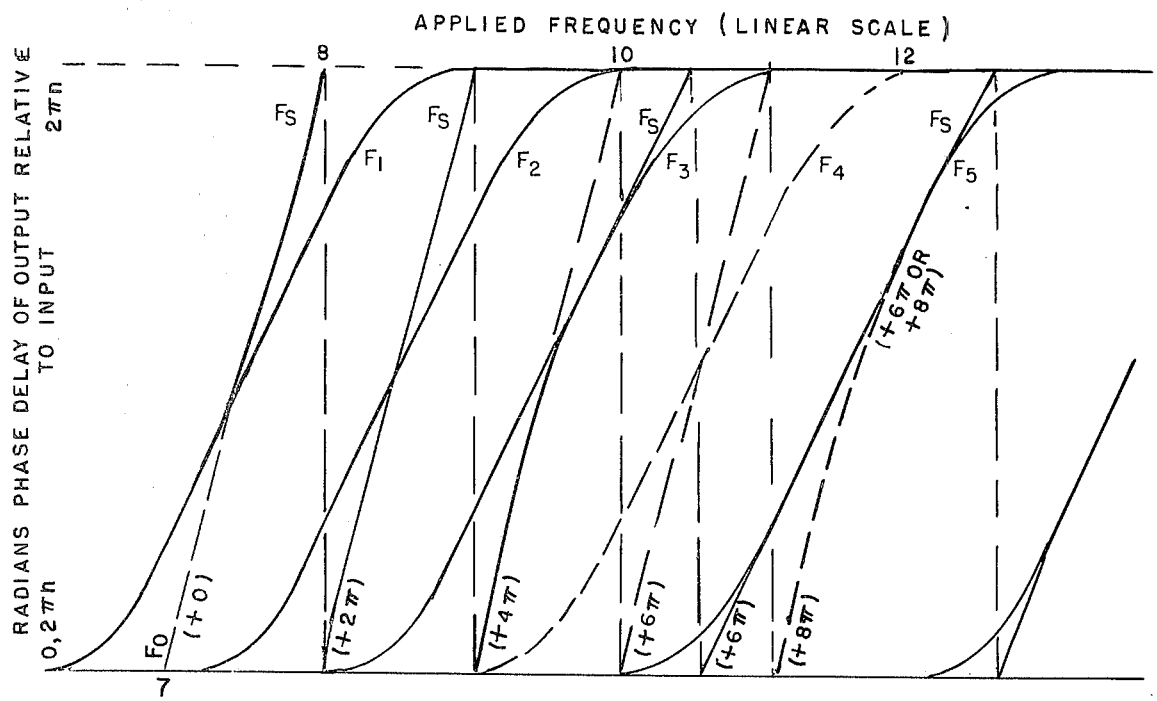

FIG. 5 shows the variation in reactance of the components in a filter section such as that of FIG. 3C with varying frequency, and the resultant phase characteristics as revealed by a rather elementary analysis of the operation over a wide range of frequencies including the frequency illustrated by the vector diagram of FIG. 4; and FIG. 6 shows the individual and combined phase characteristics of a few sections as they might occur within the group of sections used at one station.

FIG. 1 shows a typical transmitter system as used for the invention including a source of binary information 12, a pulse shaper circuit 14, a matched filter network 16, a single sideband transmitter 18, and a scrambling means 20. The source of binary information 12 has been illustrated in elementary form as a punched paper information tape 52 having holes in either the left-mark or right-space column according to the information to be transmitted. It is important but not essential to use both mark and space columns as the mere absence of a mark may be analyzed as a space at the transmitter and even at the receiver. This tape is driven over a grounded toothed drum 54 by a constant speed motor 56. Information sensing feelers 58$m$ for mark symbols and 58$s$ for space symbols make contact with the roller according to the punched data. This elementary form of input source provides both information and timing for the system. Since the punched holes are of substantial length relative to the motion of the tape they will permit contact for a substantial part of the interval between successive mark or space pulses. Auxiliary sensing feelers 59$m$ and 59$s$ in both columns of the information tape may provide common synchronizing connections with regard to mark or space information, for purposes to be described later. The motor 56 may also drive the scrambler means 20 in synchronism with the information source 12, as discussed below. The elementary pulse shaper circuit 14 includes input resistors 60$m$ and 60$s$ connecting the respective mark and space information feelers 58$m$ and 58$s$ to a source of positive input potential to generate square pulses as the respective information sensing feelers 58$m$ and 58$s$ make contact with the drum 54. In the position illustrated the sensing feeler 58$s$ has recently completed the sensing of a space hole and generated the wave illustrated at 60 $sw$. These square pulses are differentiated by capacitors 62$m$ or 62$s$ together with the corresponding resistors 64$m$ or 64$s$ to form positive and negative pulses at the beginning and end of the original pulse, as shown by the wave 64$sw$. Diodes 66$m$ and 66$s$ are used to eliminate the negative pulse in output resistors 68$m$ and 68$s$ and the actual outputs from the circuit, as shown by wave 68$sw$. The shaping need only be sufficient to leave a single pulse of a bandwidth to utilize the properties of matched filter 16.

In more sophisticated forms the input information might involve multiplex of messages from several teletype sources requiring synchronization to a common time base or clock pulse. The actual input would still have the properties of regular timing of rather sharp pulses omitted or shifted to a different network in accordance with information to be transmitted.

As already indicated briefly above the actual matched filter 16 is made up of a large number of somewhat conventional filter sections of which a few are shown used for either the mark or space signals. The various filter sections are shown connected by switching contacts 72 which may be considered as permanently connected for the purpose of an initial study of the operation. Those considered initially for transmission of a mark pulse are identified by the subscript $m$, such as $F_{1m}$, $F_{5m}$, $F_{23m}$, etc. and those for a space pulse by the subscript $s$, such as $F_{6s}$, $F_{17s}$, $F_{27s}$, etc. Some of the filter sections are shown merely as blocks while others such as $F_{1m}$ and $F_{6s}$ are shown in the familiar bridged T form. With the switches connected as shown a mark pulse would be transmitted through all the sections designated by the subscript m and similarly a space pulse through all the sections designated by the subscript $s$.

If only mark pulses were to be transmitted, as mentioned in connection with the information source 12, there would be no need for the filter sections used for space pulses. However, a full set of filter sections is desirable at the transmitter (and receiver) for reasons that will appear from time to time. The total number of filter sections and the relation between the phase characteristics of such sections is so arranged that if the pulse were transmitted through all the sections, shown as both mark and space, the effective phase delays for components of all frequencies (as indicated by Fourier analysis) would be so related that the components would coincide in phase after a delay time T to reform the original pulse. The manner of accomplishing such coincidence will be brought out below. To avoid possible difficulty from such a delayed pulse within the transmitter matched filter the mark and space outputs of the filter are shown separated, leaving the filter network on independent output leads. A somewhat random choice of about half the filter sections for a mark pulse (the others for a space pulse) usually will provide such a relation in phase delay of the various frequency components of the pulse that they would arrive at the filter output in apparently random phase so that the energy would be spread out over a considerable time, comparable to the interval between successive pulses; certain exceptions to be avoided will be noted below.

In order to change the characteristics of the successive work or space signals, as formed by the matched filter from the corresponding mark or space pulses, the switch contacts are controlled by relay coils 74 which also actuate "stick-circuit" contacts 76. The necessary energization for the relay coils is provided from a source of positive potential, and the required control directly to the coils or thru the stick-circuit contacts will be further discussed in connection with the scrambler 20. The availability of a full set of sections provides for a wide variety of characteristics for the successive mark or space signals. Since only phase variations are involved the successive signals are statistically similar in nature and the frequent change in characteristics of successive signals minimizes apparent periodicity which might reveal the nature of the signals.

Both the matched filter outputs are independently supplied to a single sideband transmitter 18 having an antenna to transmit the signals to a receiving station. The type of input required to permit each filter output to control the transmitter but not enter the other part of the filter is commonly referred to as an adder. These signals would be of wide band nature because of the many frequency components involved in the original mark or space pulses and therefore somewhat random in nature. The use of a single sideband transmitter minimizes the actual bandwidth used for transmission and also avoids the presence of a carrier signals, which involves needless energy transmission and a source of potential information to an adversary as to the origin of the signal which is to be obscured.

The scrambling means 20 has been illustrated in elementary form, corresponding to that used for the source of binary information 12, as a punched paper scrambling tape 82 having holes randomly spaced throughout the various columns. This tape is also driven by the same constant speed motor 56 in synchronism with the drum 54 of the information source over a grounded toothed drum 84. Scrambler sensing feelers 88 make contact with the roller according to the random spacing of the holes in the tape. The feelers 88 are connected to the various relay coils 74 to set up the desired random switching of the various filter sections in the matched filter 16. The punched holes in the scrambler tape are shown of a length approximately one half of the interval between the various groups of holes and therefore will retain the code setting in the matched filter only one-half of the period during which the mark or space pulse is propagating through the filter. In order to hold this code setting for the remainder of the interval the various stick-circuit contacts 76 are connected to the synchronizing sensing feelers 59$m$ and 59$s$ of the information source 12. The timing adjustment of the various sensing feelers is illustrated at a time between operations corresponding to the transmission of a single pulse, with the feelers 88 about to enter the punched holes to set up a new code combination in the matched filter. Immediately thereafter the information sensing feeler 58$m$ or 58$s$ will enter the hole corresponding to the information provided by tape 52 to start a mark or space pulse propagating through the filter. Just before the scrambling feelers 88 reach the end of the holes in the scrambler tape 82 the synchronizing feeler 59$m$ or 59$s$ enters the corresponding hole in the information tape 52 to retain operated those relay coils 74 which were set by the scrambling sensing feelers 88, so that when such feelers lose contact with the drum the code setting of the matched filter is still retained. Near the end of the cycle of operation the synchronizing sensing feeler 59$m$ or 59$s$ loses contact with the drum and releases the code setting of the filter; thus the system is restored to a condition ready for resetting of the matched filter and transmission of a new information pulse.

In more sophisticated forms the scrambling means 20 would probably involve computer type equipment to provide the great variety of coding combinations required for the desired degree of security. The basic circuitry is available in computers and may be easily programmed in various ways to give the apparently random yet reproducible operation required in transmitter and receiver systems, but cannot readily be reduced to an elementary illustration as in the case of the tape. The actual equipment would be simpler than to provide a scrambler tape of the necessary number of columns and great length required to provide the desired security. Such equipment would merely provide the desired code setting for the matched filter 16 and hold such code setting during the proper interval synchronized to the transmission of the mark or space pulses through the filter.

FIG. 2 shows a typical receiver system as used for the invention including: a single sideband receiver 28 corresponding to the transmitter 18, a matched filter network 26 identical to the matched filter 16 of the transmitter, a binary information output 22 corresponding to the information source 12, a scrambling means 30 identical to the scrambling means 20 of the transmitter, a multipath network 24, an oscilloscope 25 and synchronizing control network 27, and a received signal integrator 29. The matched filter networks 16 and 26 and their applications involve the principal subject matter of the present application, while the multipath network 24 involves the principal subject matter of the publication and the application of Kohlenberg, Sussman, and Van Meter. The receiver 28 corresponds directly to the transmitter 18 but provides only a single output which is supplied to both sections of the matched filter 26 whether a mark or space signal is received.

The matched filter 26 as shown in FIG. 2 passes the signals downward, in the opposite direction from that in FIG. 1. It will be recognized that the order in which the signals pass thru the filter elements at each station is immaterial, for the same reasons that the elements in any one complete set may be at either station. Again assuming the relays 74 not actuated in either transmitter or receiver, the various frequency components of a space pulse would undergo various apparently somewhat random phase delays thru the sections bearing subscript $s$ in the transmitter filter to spread the pulse energy over a substantial interval. At the receiver these phase delays thru the sections bearing subscript $s$ would be doubled but still random and therefore produce no output pulse; on the other hand, such delays thru the sections bearing subscript $m$ would be complemented to form an output pulse. The functions of multipath network and integrator may be ignored for the moment and the output pulse applied to the operating coil 98$s$ (not 98$m$) of the binary information output 22 to show that a space signal was transmitted. The complementary nature of the filter groups reveals why the receiver sections bearing subscript $m$ produce an output pulse for a space signal connected to coil 98$s$ and vice versa.

The binary information output 22 has also been illustrated in elementary form as a paper tape 92 having a column on which pen 95 controlled by operating coils 98$s$ or 98$m$ can record the received data as marks or spaces. This tape is also driven over a grounded toothed drum 94 by a substantially constant speed motor 96. A second complete column of punched holes passes under sensing feelers 99 and 99$a$ to provide synchronizing connections similar to that provided by feelers 59$m$ and 59$s$ in the transmitter.

The scrambling means 30 is identical to scrambling means 20 of the transmitter, including reference numerals to its components and the pattern of the punched holes, and is identically timed except for any delays due to propagation of the signal from transmitter to receiver. However, it will be recognized that due to the propagation time thru the filter sections the actual output at the recorder pen will occur near the end of the operating cycle, while the input had occurred near the beginning. Since the sensing feeler 99 is applied to a complete column of punched holes, it alone can provide the same effect as feelers 59$m$ and 59$s$ to control the relay coils 74 thru stick-circuit contacts 76. The additional feeler 99$a$ will be considered in connection with synchronizing control network 27.

The multipath network 24 involves only a few standard circuits: the adder 102, delay 104, feedback amplifier 106, and multipliers 108$s$ and 108$m$. Since the mark or space signals are statistically similar their propagation will also be similar. Since the multipath characterstics of propagation change rather slowly and the successive mark or space signals occur very rapidly the latter should arrive subjected to substantially the same delay (or delays) and with similar amplitudes, so that successive output mark or space pulses or series of pulses would be closely similar. The filter output pulses corresponding to mark or space signals may be supplied to adder 102 to give a combined waveform corresponding to multipath pattern but ignoring whether it arose from mark or space signals. The mark and space output pulses are still available individually as the adder 102 combines them only for use in the delay 104. This combined waveform may then be stored in delay network 104 and fed back thru amplifier 106 to the adder 102 to combine with the next mark or space pulse or series. The adder, delay, and amplifier may be considered a single unit as far as feedback delay and gain are concerned. For optimum operation the overall delay involved must correspond to the interval between pulses in the transmitter, so that successive signals will coinside. The gain involved must not reach unity to avoid oscillation, but may be fairly high depending on the rapidity of change in propagation relative to the interval between successive mark or space signals, the noise background, etc. A value of 0.9 is typical. The delay line output would add the most recent input at maximum amplitude, the next previous input at 90% thereof, and still earlier inputs progressively at 81%, 73%, 66%, 59%, 53%, etc. (equal to maximum / (1 − 90%) or maximum / 10%) since the forms are coherent. On the other hand, random noise would add powerwise or at maximum, 81%, 66%, 53% (equal to maximum / (1 − 81%) or maximum / 19%). The improvement in signal-to-noise ratio is therefore 19% / 10% or 1.9, nearly double. The stored signal therefore indicates the presently prevailing multipath pattern, and follows gradual changes in the pattern yet minimizes noise. The delay 104 might readily be made up as an additional full set of filter sections as used in the matched filters 16 or 26.

If this pattern is supplied to the multipliers 108$s$ and 108$m$ with the respective space and mark signals any components of such signals coinciding with the pattern will be emphasized as probably true signals and any components not coinciding will be minimized as probably noise, thus improving the signal-to-noise ratio of particular successive mark or space signals. The multipliers, sometimes known as correlators, etc. may be analyzed as fully balanced modulators as in FIG. 15–13($b$), page 540 of Terman, Electronic and Radio Engineering, 4th Ed., McGraw-Hill, 1955 in which either input alone produces no output but together they produce outputs. They may also be analyzed as gating or coincidence circuits.

To combine the several pulses of each multipath group the integrating circuit 29 includes input resistors 112$s$ and 112$m$ and storage capacitors 114$s$ and 114$m$, of sufficient time constant to store the several pulses, and shortcircuiting triodes 116$s$ and 116$m$ controlled by a differentiating circuit including input capacitor 118 and load resistor 120 from the sensing feeler 99, thus eliminating the stored energy from one mark or space signal to be ready for a succeeding signal. The multipath and integrating circuits assure that each signal component under multipath conditions can make its contribution to the received signal yet noise is substantially eliminated.

The same signal stored by the delay 104 may be supplied directly to the signal input of an oscilloscope 25 whose synchronizing input is supplied from the sensing feeler 99. In this case the combining of the several successive signals is accomplished mainly in the adder and delay network, rather than thru the retentivity of the oscilloscope screen or the observer's eyes, altho there would be little difference in the effect.

The same signal may also be used to synchronize the operation of the receiver information and scrambler tape drums 94 and 84. The sensing feelers 99 and 99$a$ are arranged to make contact with drum 94 alternately thru the single complete column of holes intended for synchronizing. A source of positive potential connected thru resistors 132 and 132a to the feelers 99 and 99a will provide square wave voltages at each feeler as the drum 94 rotates; the other circuits connected to feeler 99 would cause no difficulty sufficient to demand isolation between the two loads. The conventional time discriminator 134 may also be analyzed as a balanced modulator or coincidence network providing an output reversing in polarity depending on the relative magnitudes of the pulse components occurring during the times feelers 99 and 99a are in contact with drum 94. This output may be applied to a speed controller 136 to keep the motor 96 at the proper synchronous speed for the system, which will provide stable operation with the feelers 99 or 99a serving as the early and late sensing gates. As previously indicated the feeler 99 loses contact with drum 94 at the end of a cycle of operation, just after the filter output pulse is recorded, and may be considered as the source for an "early gate." The feeler 99a is timed to make contact just before the output pulse is recorded and may be considered as the source for a "late gate." When properly synchronized the mark or space pulse or series of pulses would fall equally within the early or late gates to retain the speed of motor 96. When the pulse or series occurs late it would fall more heavily within the late gate than the early gate and the discriminator output polarity to the speed controller 136 would be such as to slow down the driving motor 96, and vice versa.

The mathematical analysis of filters is very highly developed but also very complex. For the purpose of the present application a qualitative rather than quantitative approach will be used. Those familiar with mathematical analysis will have no difficulty in extending the principles to any desired degree of detail, while those not so qualified will still be able to understand the operation without excessive difficulty. The filter sections are shown in FIG. 1 with unbalanced input and output and a common ground connection to avoid the need for balanced inputs and outputs and to minimize the number of relay contacts required for switching the sections. However, the actual filter section operation can be more readily analyzed from the elementary resistance and reactance viewpoint by converting to another form, first duplicating the section to show a balanced form as in FIG. 3a, then substituting the standard equivalent balanced lattice form as in FIG. 3b, then considering the phase relations involved in only one-half the output as emphasized by FIG. 3c. It should be recognized that the component values would not be the same in the bridged-T and lattice forms, but may be calculated to provide the same effect.

The subscripts $p$-parallel, and $s$-series are used below to designate the simple parallel and series capacitance and inductance pairs used in a multiple pair network, such as a filter section or system. It will be noted that in a filter system an input signal normally passes in a series path thru several pairs of either type to reach output and also in parallel path thru several pairs of either type as well as the output. In the bridge-T form as in FIG. 3a the parallel pair appears to be in a predominantly series path and the series pair in the parallel (or shunt) paths. In a filter system using sections of the basic lattice form as in FIG. 3b (readily shown also as a bridge) one cannot designate paths as basically series or parallel.

Elementary examination of FIG. 3c reveals that at rather low frequency the voltage input E reaches the output with only a slight phase lag or delay due to inductance $L_p$. Similarly, at rather high frequency there is a slight phase "lead" due to capacitance $C_p$; since the present invention involves pulse energization and no output can actually precede input this may initially be assumed as a phase delay of nearly $2\pi$ radians. At or very near resonance the combined reactance of $L_p$ and $C_p$ is very high. At resonance the combined reactance $L_s$ and $C_s$ is negligible, applying the reversed voltage $-E$ to the output, corresponding to a $\pi$ radian phase delay. Just below resonance the combined reactance of $L_s$ and $C_s$ is still low, and dominated by $C_s$, corresponding to just under $\pi$ radian phase delay; similarly just above resonance there would be just over $\pi$ radian phase delay. Thus the series pair dominates output near resonance and the parallel pair remote from resonance.

At the frequency 1.6 Fr as noted on FIG. 3c the combined reactance of the series pair is inductive and equal to the capacitive reactance of the parallel pair. This would involve an overall resonance of the two pairs, each equally effective in the output. Assuming a load resistance of equal magnitude the voltages and currents would be as represented by the vector diagrams of FIG. 4, with a phase delay of $3\pi/2$ radians relative to input. A similar situation exists at 0.6 $F_r$, involving a phase delay of $\pi/2$ radians.

FIG. 5 shows the capacitive and inductive reactance $X_c$ and $X_l$ of the components and $X_p$ and $X_s$ of the pairs at various frequencies, and (with a load resistance as mentioned just above) the effective phase delay of the output filter section. to the input $\phi_p$ and $\phi_s$ as affected by each pair of $\phi_f$ as affected by both pairs in the filter-section. It will be noted that the above-mentioned actual phase delay of $3\pi/2$ radians at 1.6 $F_r$ (or $\pi/2$ radians at 0.6 $F_r$) is the theoretical limit of phase delay for either pair alone. By varying the relative values of the components a desired phase characteristic following this general shape may be provided. Typical values as actually used are enumerated below. It may be helpful to recognize that this phase characteristic, plotted in frequency and phase coordinates (with no showing of amplitude) may also be shown as a circle diagram, plotted in angular coordinates (showing amplitude but with no frequency coordinate), or even as a 3-dimensional curve (with all three coordinates), similar in shape to a tension spring having long straight ends in the zero or $2\pi$ radian phase plane and parallel to the frequency axis and a single turn helix about the frequency axis at the region near resonance; the phase characteristic shown actually is the development of the cylinder about the frequency axis in which the three dimensional curve lies, indicating that zero and $2\pi$ radian lines superpose for most purposes.

FIG. 6 illustrates the phase delay of several filter sections $F_1$, $F_2$, $F_3$, $F_5$, with or without section $F_4$ on the overall phase delay $F_s$ of the group. With all sections included the overall charcteristic is linear in the applied frequency range of interest above the frequency value 7.5, including sections marked ($-0$), ($+2\pi$), ($+4\pi$), etc. The linear portion of the characteristic corresponding to ($+0$) would cross the axis at the frequency value 7, the portion ($+2\pi$) at 8, etc. The overall phase characteristic could also be plotted as a circle diagram (of several turns) or in three coordinates in a shape similar to a tension spring having long straight ends in the zero or $2\pi$ n radian phase plane and a multiple turn helix. The designations ($+0$), ($+2\pi$), ($+4\pi$), etc. identify the number of full phase rotations to be added to the vertical phase delay coordinate to give the total phase delay for frequencies in that range; dash lines vertically across the diagram show the points where the characteristic has been transferred back to the zero phase delay line to avoid the need for a phase delay coordinate of many complete cycles.

According to the usual analysis of wide-band filter operation the slope of this combined characteristic establishes the time delay in the filter for the many frequency components to arrive in proper phase at the output to re-form the pulse or other waveform. This is fully analyzed in Communication Networks Vol. II Guillemin 1935 John Wiley & Sons pp. 490 – 492; the same analysis there expressed in terms of group or envelope velocity may readily be converted to the reciprocal value, group or envelope delay. If the slope is uniform throughout the entire band of interest this time delay will accomplish the desired phase relations to re-form the pulse.

The foregoing description has been based only on digital pulse communication, but would also be suitable for radar where the actual information is derived from the propagation delay. However, the same properties which make the system suitable for this purpose also make it suitable for other waveforms of somewhat random character. In this case the decrease of peak signal may be of minor importance but the obscuring effect is accomplished even without the switching of the filter sections.

When the filter system lacks sections within the frequency band of interest, as when half the sections are selected at random for the mark (and the others for the space) filter group at the transmitter, the characteristic will not ordinarily be linear and the various frequency components will not reach phase coincidence to re-form the pulse. Therefore the pulse energy will be spread out in time as desired for transmission. However, if sections 1, 3, 5, etc. were used for the mark pulse and 2, 4, 6, etc. for the space pulse, each combination might have linear (and equal) overall characteristics, causing the original pulses to still exist in the actual transmitted signal (at half the total delay) not even distinguishable as to whether mark or space pulse was intended. To avoid such possibilities the filter sections have been grouped as noted by the following table:

| Initially Mark | Initially Space |
|---|---|
| 15, 16 | 27, 28 |
| 13, 14 | 21, 22 |
| 11, 12 | 31, 32 |
| 9, 10 | 25, 26 |
| 7, 8 | 19, 20 |
| 5, 6 | 29, 30 |
| 3, 4 | 23, 24 |
| 1, 2 | 17, 18 |

Since this table follows the general arrangement of the sections as in FIG. 1 it will be apparent that operation of the lowest switch would merely exchange entire mark group and space group, operation of the switch below sections 5, 6, 29, 30 would exchange those sections and all sections above in the table, etc. In a typical set of filter sections of the bridged-T form the inductance values for the series pair $L_s$ are all 0.260 mh, while the capacitance values for each unit of the parallel pair $C_p$ are all 120.0 mfd. The remaining component values are shown by the following table showing the capacity values in mfd for the series pair and the inductance values in mh for the parallel pair:

| Sec | $C_s$ | $L_p$ | Sec | $C_s$ | $L_p$ |
|---|---|---|---|---|---|
| 16 | 0.02148 | 19.01 | 32 | 0.00649 | 5.91 |
| 15 | 0.023388 | 21.04 | 31 | 0.00687 | 6.25 |
| 14 | 0.02671 | 23.42 | 30 | 0.00728 | 6.62 |
| 13 | 0.03008 | 26.21 | 29 | 0.00774 | 7.03 |
| 12 | 0.03415 | 29.54 | 28 | 0.00823 | 7.47 |
| 11 | 0.03912 | 33.54 | 27 | 0.00878 | 7.96 |
| 10 | 0.04529 | 38.40 | 26 | 0.00938 | 8.50 |
| 9 | 0.05308 | 44.39 | 25 | 0.01005 | 9.09 |
| 8 | 0.06313 | 51.89 | 24 | 0.01079 | 9.75 |
| 7 | 0.07645 | 61.44 | 23 | 0.01162 | 10.48 |
| 6 | 0.09470 | 73.85 | 22 | 0.01255 | 11.30 |
| 5 | 0.12077 | 90.35 | 21 | 0.01359 | 12.21 |
| 4 | 0.16026 | 112.94 | 20 | 0.01478 | 13.24 |
| 3 | 0.22522 | 144.90 | 19 | 0.01611 | 14.41 |
| 2 | 0.34722 | 192.00 | 18 | 0.01766 | 15.74 |
| 1 | 0.55 | 237.2 | 17 | 0.01943 | 17.26 |

Many variations and other applications of the invention as defined by the following claims will be apparent from the foregoing description and analysis.

What is claimed is:

1. In a wideband matched filter communication system or transmitting digital information identified by initial sharp pulses from a transmitter thru a communication channel to a receiver, a filter network comprising a multiplicity of filter sections of differing phase-frequency characteristics all in series, the overall characteristic of the entire multiplicity of sections being linear, said sections being distributed between a group at said transmitter and another group at said receiver, the overall characteristics of the sections in each group being non-linear, whereby the various frequency components of the initial sharp pulse are differently delayed in the transmitter group to decrease the amplitude of the pulse signal by spreading its energy over a substantial time period and also differently delayed in the receiver group, but in a complementary manner, to restore the pulse in the receiver at a predetermined time delay due to the operation of the filter.

2. A filter network as in claim 1 wherein said entire multiplicity of filter sections are provided at both transmitter and receiver, the additional sections serving as additional series groups for transmission of alternative signal pulses in parallel to said first groups, the receiver output being derived from the difference between the pulses thru the alternative groups, whereby the effect of random noise interference is reduced to a minimum.

3. A filter network as in claim 1 wherein said entire multiplicity of filter sections are provided at both transmitter and receiver, and synchronized switching means for frequently changing between successive signals the sections used in the groups at transmitter and receiver, whereby the presence and nature of the information being transmitted is effectively obscured.

4. In a wideband matched filter communication system for transmitting information from a transmitter through a communication channel to a receiver, a filter network comprising a multiplicity of filter sections of differing phase-frequency characteristics all in series, the overall characteristic of the entire multiplicity of sections being linear, said sections being distributed between a group at said transmitter and another group at said receiver, the overall characteristics of the sections in each group being non-linear, whereby the various frequency components of the information are differently delayed in the transmitter group to obscure the presence and nature of the information being transmitted, and also differently delayed in the receiver group, but in a complementary manner, to restore the information in the receiver at a predetermined time delay due to the operation of the filter.

5. A filter network as in claim 4 wherein said entire multiplicity of filter sections are provided at both transmitter and receiver, and synchronized switching means for changing the sections used in the groups at transmitter and receiver, whereby the presence and nature of the information being transmitted is further obscured.

* * * * *